United States Patent [19]

Mitchell

[11] Patent Number: 5,301,114
[45] Date of Patent: Apr. 5, 1994

[54] INERTIAL NAVIGATION SYSTEM INCLUDING SELF-CONTAINED PERFORMANCE VALIDATING ARRANGEMENT

[75] Inventor: William J. Mitchell, Upper Montclair, N.J.

[73] Assignee: AlliedSignal Inc., Morris Township, Morris County, N.J.

[21] Appl. No.: 897,137

[22] Filed: Jun. 11, 1992

[51] Int. Cl.$^5$ ............... H04B 7/185; G06F 15/50
[52] U.S. Cl. .................. 364/453; 342/358; 73/1 E; 73/178 R; 364/559
[58] Field of Search ............ 364/453, 459, 443, 449; 73/178 R; 33/324

[56] References Cited

U.S. PATENT DOCUMENTS

| | | | |
|---|---|---|---|
| 4,280,188 | 7/1981 | Weinstein et al. | 364/453 |
| 5,067,084 | 11/1991 | Kau | 364/453 |
| 5,194,872 | 3/1993 | Mosuff et al. | 364/453 |

OTHER PUBLICATIONS

Harrison, J. V. and E. G. Gai, 'Evaluating Sensor Orientations for Navigation Performance and Failure Detection', Nov. 1977, pp. 631–643.

Gelb, A., 'Synthesis of a Very Accurate Inertial Navigation System', Jun. 1965, pp. 119–128.

Morrell, F. R. & Motyka, P., 'Unified Analysis Methods for a Fault Tolerant Redundant Strapdown Inertial Navigation Unit', Oct. 1983, 21.6.1–21.6.10.

Primary Examiner—Thomas G. Black
Assistant Examiner—Tyrone V. Walker
Attorney, Agent, or Firm—Donald B. Paschburg; Howard G. Massung

[57] ABSTRACT

The accuracy of the performance of an inertial navigation system is validated by comparing data measured by a fourth gyro and accelerometer to an analytic equivalent constructed from measurements made by a primary gyro/accelerometer orthogonal triad.

10 Claims, 2 Drawing Sheets

INERTIAL NAVIGATION SYSTEM INCLUDING SELF-CONTAINED PERFORMANCE VALIDATING ARRANGEMENT

BACKGROUND OF THE INVENTION

This invention relates generally to inertial navigation systems of the type including a primary gyro/accelerometer triad and particularly to an arrangement wherein system performance is validated by comparing data measured by a fourth gyro/accelerometer to an analytical equivalent established from measurements made by the primary triad.

Current land vehicle weapon scenarios involve "shoot and scoot" procedures. That is to say, radar tracks the ballistic trajectory of a first enemy round, determines the firing site of the round and directs opposing fire before the first enemy round has landed. A high degree of mobility is required, i.e. fire opposing rounds for effect and depart firing sites quickly.

Stable reference platform navigation systems gyrocompass in a relatively secure "hide zone" while the land vehicle is stationary. When a fire mission is initiated the vehicle may travel tens of kilometers over a few hours. The objective, as aforenoted, is to fire a round quickly and to vacate the fire site.

The massive firepower of modern land vehicle weapons systems poses a significant problem, i.e. the adverse consequences of misdirected fire. The need to validate firing accuracy to better than five mils of attitude error leads to the conclusion that a second system which enables comparison of results against an error criteria be implemented. Indeed, a stable reference platform mechanization does not allow for an independent measurement short of using a second system. It is of special significance to be able to validate attitude while the vehicle is moving.

SUMMARY OF THE INVENTION

This invention contemplates an inertial navigation system including a performance validating arrangement featuring a strapdown inertial navigation system including an inertial sensor assembly having an orthogonal triad, i.e. three gyros and three accelerometers. A fourth gyro and accelerometer are added to the inertial sensor assembly so that their input axes symmetrically bisect those of the orthogonal triad. Incremental angles and incremental velocities are compensated for instrument and dynamic errors. The incremental angle and velocity vectors, measured by the orthogonal triad are transformed to an equivalent measurement along the input axes of the fourth gyro and fourth accelerometer. With the arrangement described two independent measurements of incremental angles and velocities are made.

Each of the two independent measurements are summed immediately after the system is aligned. The differences between the sums of the incremental angles represent the error in net angle rotated about the input axis of the fourth gyro as measured by two independent observations. These differences also contain the integration of uncompensated instrument and computational errors. The differences will be time dependent and the error criteria will have an expanding envelope within which these differences must remain, otherwise a "no confidence" condition will be initiated. The incremental angle differences, the differences in the integration of angular rates, will be a first order linear function of time. The individual summation of incremental angles will be reasonably small, representing the net angle that the inertial navigation system was moved about the axis of the fourth gyro, plus the integrated history of the projection of earth's rate.

The incremental velocities when summed are the double integral of acceleration, i.e. position, and their values will increase in proportion to the square of time. Depending on particular criteria, the incremental angle summing devices will have to be reset once every three to five minutes. The fourth accelerometer can also be used to cross check the other three accelerometers at the fire site as it should see the same component of gravity as the analytical equivalent sensor derived from the orthogonal triad.

DETAILED DESCRIPTION OF THE INVENTION

Figure 1:
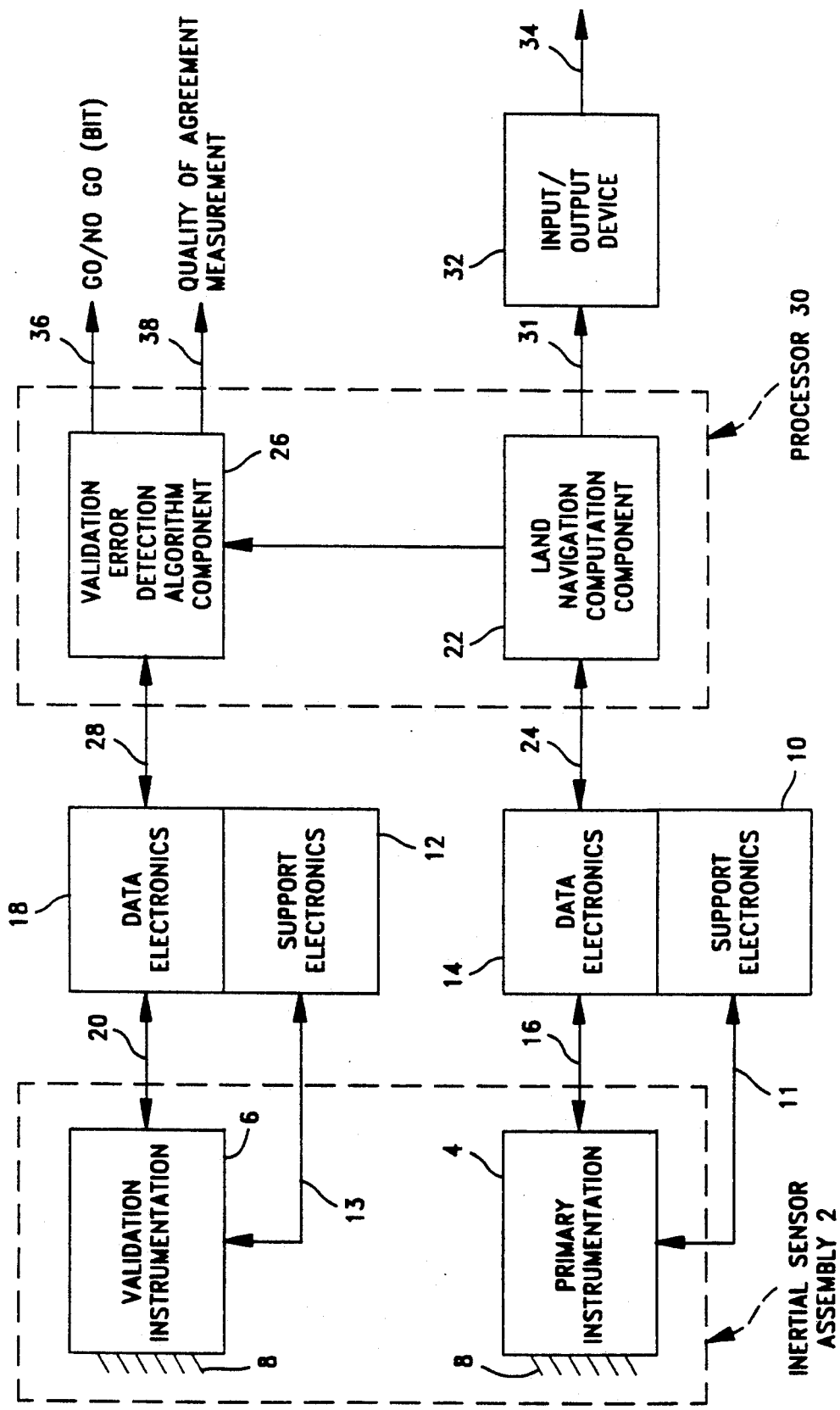
FIG. 1 is a block diagram generally illustrating the features of the invention.

With reference to FIG. 1, a strapdown inertial navigation system includes an inertial sensor assembly (ISA) 2. ISA 2 includes primary instrumentation 4 and validation instrumentation 6. Primary instrumentation 4 includes a substantially orthogonally oriented triad, i.e. three gyros and three accelerometers and validation instrumentation 6 includes a fourth gyro and a fourth accelerometer as will be further referred to with reference to FIG. 2. The arrangement is such that the input axes of the fourth gyro and the fourth accelerometer symmetrically bisect the input axes of the gyros and accelerometers in the orthogonal triad. In this regard, it will be understood that primary as well as validation instrumentation components must be mounted to a common mechanical structure 8 in order to preserve the input axis alignment stability as is required.

Primary instrumentation 4 and validation instrumentation 6 can be completely electrically independent, i.e. have their own support electronics 10 and 12, respectively, as illustrated in FIG. 1 as well as their own low voltage power supplies, etc., not otherwise shown. Alternatively, the primary validation instrumentation can share this equipment, as will be readily understood by those skilled in the art.

Primary instrumentation 4 is connected to support electronics 10 via an input/output conductor 11 and validation instrumentation 6 is connected to support electronics 12 via an input/output conductor 13.

Primary instrumentation 4 is connected to data electronics 14 via an input/output conductor 16 and validation instrumentation 6 is connected to data electronics 18 via an input/output conductor 20. Data electronics 14 is connected to a land navigation computation component 22 via an input/output conductor 24 and data electronics 18 is connected to a validation error detection algorithm component 26 via an input/output conductor 28.

Land navigation computation component 22 and validation error detection algorithm component 26 can operate via the same processor 30 as illustrated in FIG. 1. Alternatively, the components can operate via separate processors, or via two processors with the results thereupon compared, as will be readily understood by those skilled in the art.

Figure 2:
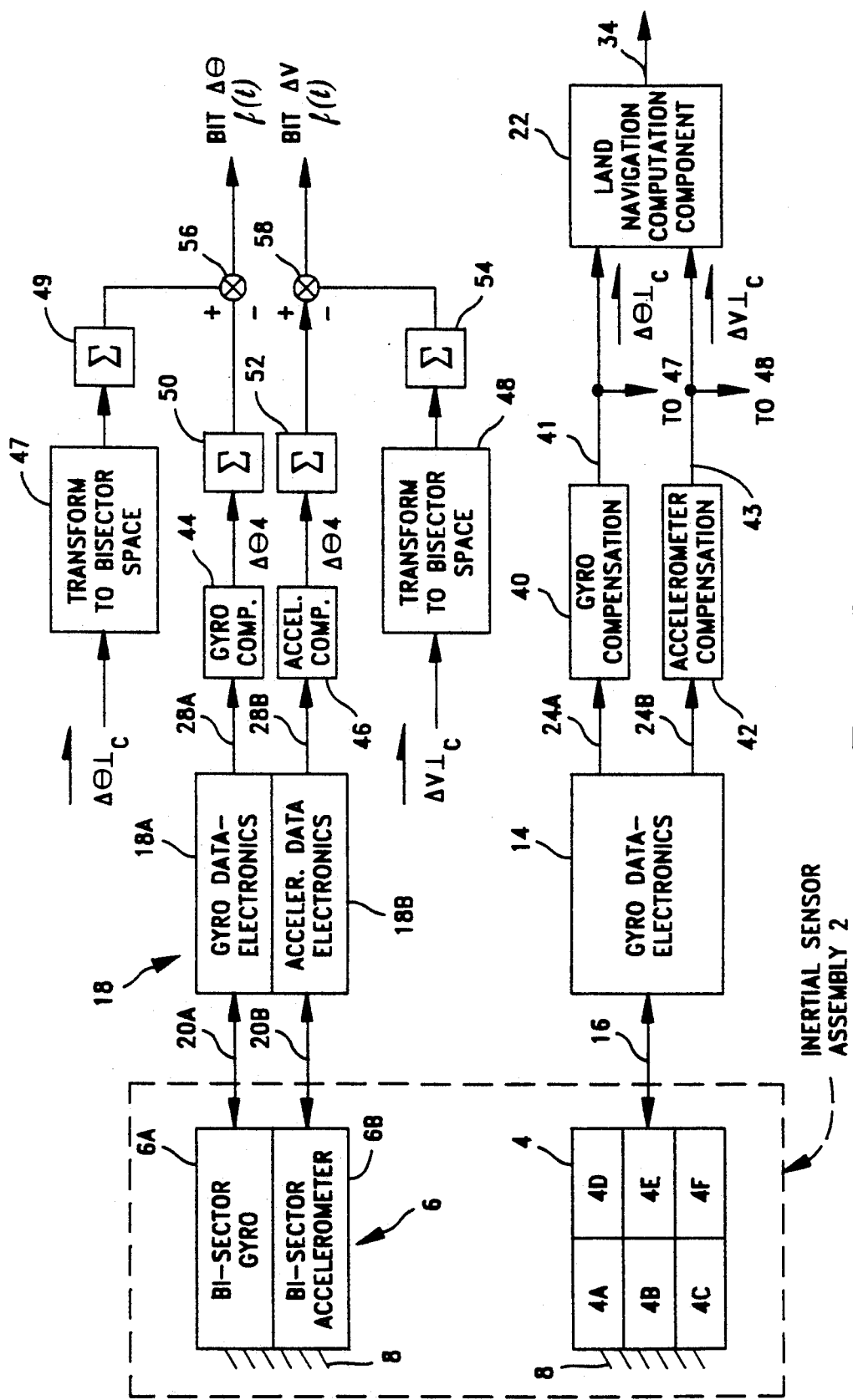
FIG. 2 is a block diagram more particularly illustrating the features of the invention.

In this regard, it will be understood that the memory and real time requirements for this processing is likely to be smaller than that required for navigation processing. Most of the real time will be required for dynamic compensation. It will be noted that integrations which are performed and as will be further referred to with reference to FIG. 2 are one dimensional and simply require summations.

Land navigation computation component 22 is connected via a conductor 31 to an input/output device 32 which provides an output at an output conductor 34 which may be used at other points in the system or in other systems, as may be desired.

Validation error detection algorithm component 26 provides a BIT (built-in test) go/no go output at an output conductor 36 and provides a quality of agreement measurement output at an output conductor 38.

Thus, FIG. 1 shows the general arrangement of means for confirming the accuracy and performance of the inertial navigation system by comparing data measured by a fourth gyro and accelerometer to an analytic equivalent constructed from measurements made by a primary substantially orthogonal gyro/accelerometer triad.

With reference now to FIG. 2, wherein elements corresponding to those in FIG. 1 carry corresponding numerical designations, primary instrumentation 4 particularly includes a substantially orthogonally disposed triad of three gyros 4A, 4B and 4C and three accelerometers 4D, 4E and 4P. Primary instrumentation 4 is connected to data electronics 14 via input/output conductor 16 as described with reference to FIG. 1.

Data electronics 14 provides an output at an output conductor 24A which is applied to a gyro compensation means 40, and provides an output at an output conductor 24B which is applied to an accelerometer compensation means 42. Thus, incremental angles and incremental velocities are compensated for instrumentation and dynamic errors by means 40 and 42 as will now be discerned.

The output of gyro compensation means 40 at an output conductor 41 is a compensated incremental angle vector $$\overrightarrow{\Delta\theta\perp_c}$$

and the output of accelerometer compensation means 42 at an output conductor 43 is a compensated incremental velocity vector $$\overrightarrow{\Delta V\perp_c}$$

Output conductors 41 and 43 are connected to land navigation computation component 22.

Validation instrumentation 6 includes a bisector gyro 6A and a bisector accelerometer 6B. That is to say, the input axes of the bisector gyro 6A and bisector accelerometer 6B symmetrically bisect the input axes of gyros 4A, 4B and 4C and accelerometers 4D, 4E and 4F, respectively, in the orthogonal triad of primary instrumentation 4. Bisector gyro 6A is connected to gyro data electronics 18A in data electronics 18 via an input/output connector 20A and bisector accelerometer 6B is connected to acceleration data electronics 18B in data electronics 18 via an input/output connector 20B. Gyro data electronics 18A provides an output at an output File conductor 28A which is applied to a gyro compensation means 44, and accelerometer data electronics 18B provides an output at an output conductor 28B which is applied to an accelerometer compensating means 46.

The incremental angle vector $$\overrightarrow{\Delta\theta\perp_c}$$

and the incremental velocity vector $$\overrightarrow{\Delta V\perp_c}$$

measured by the orthogonal triad are transformed to an analytical equivalent measurement along the axes of the fourth gyro and fourth accelerometer. Thus, the incremental angle vector is transformed to bisector space via 47 and the incremental velocity vector is transformed to bisector space via 48.

Two independent measurements of incremental angle and velocity are made. That is to say, the outputs at 47 are summed at 49; the incremental bisector gyro angles ($\Delta\theta 4$) are summed at 50; the incremental bisector velocities ($\Delta V4$) are summed at 52 and the outputs at 48 are slimmed at 54. The differences between the summed incremental angles are taken at summing means 56 which provides an error criteria BIT$\Delta\theta$ as a function of time, and the differences between the summed incremental velocities are taken at summing means 58 which provides an error criteria BIT$\Delta V$ as a function of time.

Each of these measurements are summed immediately after the system is aligned. The difference between the sums of the incremental angles represents the error and net angle rotated about the axis of bisector gyro 6A, as obtained by two independent measurements. These differences contain the integration of uncompensated instrument and computational errors. The differences will be time dependent and the error criteria will have an expanding envelope that these differences must remain within or a "no confidence bit" will be initiated. The incremental angle difference, i.e. the difference in the integration of angular rates, will be a first order linear function of time. The individual summations of incremental angles should be reasonably small, representing the net angle the inertial navigation system has moved about this axis.

It will be appreciated that the incremental velocities when summed are the double integral of acceleration, i.e. position, and their values will increase in proportion to the square of time. Depending on particular criteria, the summation devices 49–54 will have to be reset once every three to five minutes. The fourth or bisector accelerometer 6B can also be used as a cross check for the other three accelerometers at the fire site as it should see the same component of gravity as the analytic equivalent sensor derived from the orthogonal triad.

In accordance with the above, the present invention provides means to confirm the accuracy and proper performance of an inertial navigation system by comparing data measured by a fourth gyro and accelerometer to an analytical equivalent established from measurements made by a primary gyro/accelerometer orthogonal triad. The disclosed validation approach provides a measure of divergence between two independent measurements, i.e. the differences in angle and the differences in position. The size of these differences represents the quality of the validation and can be provided to a user in the same context as a global positioning system (GPS).

In this regard it will be understood that a GPS can be used to provide a similar validation arrangement. However, in land vehicle applications, terrain, foliage and structures may shade the line-of-sight to the satellites used so as to inhibit use or continuous comparison.

With the above description of the invention in mind, reference is made to the claims appended hereto for a detailed description of the invention.

What is claimed is:

1. An inertial navigation system including a self-contained performance validating arrangement, comprising:
   an inertial sensor assembly including a substantially orthogonal triad having three gyros and three accelerometers;
   said inertial sensor assembly including a fourth gyro and a fourth accelerometer having input axes which symmetrically bisect the input axes of the orthogonal triad;
   means for establishing an analytical equivalent to data from the fourth gyro and the fourth accelerometer from measurements made by the orthogonal triad including means for providing compensated incremental angle vectors, means for providing compensated incremental velocity vectors, and means for transforming the incremental angle vectors and the incremental velocity vectors to an analytical equivalent measurement along the axes of the fourth gyro and the fourth accelerometer, respectively; and
   means for comparing data from the fourth gyro and the fourth accelerometer to said analytical equivalent for validating the performance of the inertial navigation system.

2. A system as described by claim 1, wherein:
   the means for providing a compensated incremental angle vector includes means for compensating for instrumentation and dynamic errors; and
   the means for providing a compensated incremental velocity vector includes means for compensating for instrumentation and dynamic errors.

3. An inertial navigation system including a self-contained performance validating arrangement, comprising:
   an inertial sensor assembly including a substantially orthogonal triad having three gyros and three accelerometers;
   said inertial sensor assembly including a fourth gyro and a fourth accelerometer having input axes which symmetrically bisect the input axes of the orthogonal triad;
   means for establishing an analytical equivalent to data from the fourth gyro and the fourth accelerometer from measurements made by the orthogonal triad;
   means for comparing data from the fourth gyro and the fourth accelerometer to said analytical equivalent for validating the performance of the inertial navigation system;
   means for summing the transformed incremental angle vectors and for providing a first summation output;
   means for summing the transformed incremental velocity vectors and for providing a second summation output;
   means for summing the incremental bisector angles from the fourth bisector gyro and for providing a third summation output;
   means for summing the incremental bisector velocities from the fourth bisector accelerometer and for providing a fourth summation output;
   means for taking the differences between the first and third summation outputs, said differences corresponding to an angle error criteria; and
   means for taking the differences between the second and fourth summation outputs, said differences corresponding to a velocity error criteria.

4. A system as described in claim 3, wherein:
   the differences between the first and third summation outputs correspond to the net angle rotated about the input axis of the fourth gyro.

5. A system as described by claim 3, wherein:
   the differences between the second and fourth summation outputs are the double integral of acceleration and correspond to position.

6. A self-contained method for validating the performance of an inertial navigation system, comprising:
   providing an inertial sensor assembly with a substantially orthogonal triad having three gyros and three accelerometers;
   providing a fourth gyro and a fourth accelerometer having input axes which symmetrically bisect the input axes of the orthogonal triad;
   establishing an analytical equivalent to data from the fourth gyro and the fourth accelerometer from measurements made by the orthogonal triad including establishing compensating incremental angle vectors, establishing compensated incremental velocity vectors, and transforming the incremental angle vectors and the incremental velocity vectors to an analytical equivalent measurement along the axes of the fourth gyro and the fourth accelerometer, respectively; and
   comparing data from the fourth gyro and the fourth accelerometer to said analytical equivalent for validating the performance of the inertial navigation system.

7. A system as described by claim 6, including:
   compensating the incremental angle and velocity vectors for instrumentation and dynamic errors.

8. A method as described by claim 6, including:
   summing the transformed incremental angle vectors and providing a first summation output;
   summing the transformed incremental velocity vectors and providing a second summation output;
   summing the incremental bisector angles from the fourth bisector gyro and providing a third summation output;
   summing the incremental bisector velocities from the fourth bisector accelerometer and providing a fourth summation output;
   taking the differences between the first and third summation outputs, said differences corresponding to an angle error criteria; and
   taking the differences between the second and fourth summation outputs, said differences corresponding to a velocity error criteria.

9. A method as described by claim 8, wherein:
   the differences between the first and third summation outputs correspond to the net angle rotated about the input axis of the fourth gyro.

10. A method as described by claim 8, wherein:
    the differences between the second and fourth summation outputs are the double integral of acceleration and correspond to position.

* * * * *